(12) United States Patent
Kagawa et al.

(10) Patent No.: US 7,498,980 B2
(45) Date of Patent: Mar. 3, 2009

(54) CARRIER PHASE GPS POSITIONING DEVICE AND METHOD

(75) Inventors: Kazunori Kagawa, Toyota (JP); Masashi Yamashita, Toyota (JP); Yasuhiro Tajima, Toyota (JP); Hirohisa Onome, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 251 days.

(21) Appl. No.: 10/574,218

(22) PCT Filed: Dec. 2, 2004

(86) PCT No.: PCT/JP2004/018328

§ 371 (c)(1),
(2), (4) Date: Mar. 31, 2006

(87) PCT Pub. No.: WO2005/054889

PCT Pub. Date: Jun. 16, 2005

(65) Prior Publication Data

US 2007/0057839 A1 Mar. 15, 2007

(30) Foreign Application Priority Data

Dec. 2, 2003 (JP) ............................ 2003-403640

(51) Int. Cl.
*G01S 5/14* (2006.01)
*G01S 1/00* (2006.01)
*H04B 7/185* (2006.01)
*G01C 21/00* (2006.01)

(52) U.S. Cl. .................... 342/357.04; 342/357.06; 701/216

(58) Field of Classification Search ............ 342/357.04, 342/357.06; 701/216
See application file for complete search history.

(56) References Cited

U.S. PATENT DOCUMENTS

| 5,451,964 A | * | 9/1995 | Babu ..................... 342/357.06 |
| 5,502,641 A | | 3/1996 | Isomura |
| 5,903,236 A | | 5/1999 | Lawrence |
| 6,127,968 A | | 10/2000 | Lu |
| 6,181,274 B1 | * | 1/2001 | Pratt et al. ............. 342/357.04 |
| RE37,256 E | * | 7/2001 | Cohen et al. ........... 342/357.06 |
| 6,373,432 B1 | | 4/2002 | Rabinowitz et al. |

(Continued)

FOREIGN PATENT DOCUMENTS

JP 07-190679 7/1995

(Continued)

*Primary Examiner*—Thomas H Tarcza
*Assistant Examiner*—Harry Liu
(74) *Attorney, Agent, or Firm*—Finnegan, Henderson, Farabow, Garrett & Dunner, LLP.

(57) ABSTRACT

A carrier phase GPS positioning device is disclosed, which acquires a carrier phase accumulation value of satellite signals at one time on the mobile station side, associates plural carrier phase accumulation values on the reference station side at plural times prior to the one time with the carrier phase accumulation value on the mobile station side, and estimates an integer ambiguity included in the carrier phase accumulation value of signals transmitted from the satellite received by the mobile station.

14 Claims, 9 Drawing Sheets

U.S. PATENT DOCUMENTS

| | | | |
|---|---|---|---|
| 6,791,472 B1 * | 9/2004 | Hoffberg | 340/905 |
| 6,795,771 B2 * | 9/2004 | Fuchs et al. | 701/213 |
| 6,810,324 B1 * | 10/2004 | Nadkarni | 701/207 |
| 7,299,133 B2 * | 11/2007 | Duncan et al. | 702/14 |
| 2001/0020216 A1 | 9/2001 | Lin | |
| 2002/0169545 A1 * | 11/2002 | Toyooka | 701/207 |
| 2003/0216864 A1 * | 11/2003 | Fukuda et al. | 701/216 |

FOREIGN PATENT DOCUMENTS

| | | |
|---|---|---|
| JP | 07-190769 | 7/1995 |
| JP | 2001-099910 | 4/2001 |
| WO | WO 98/43372 | 10/1998 |

* cited by examiner

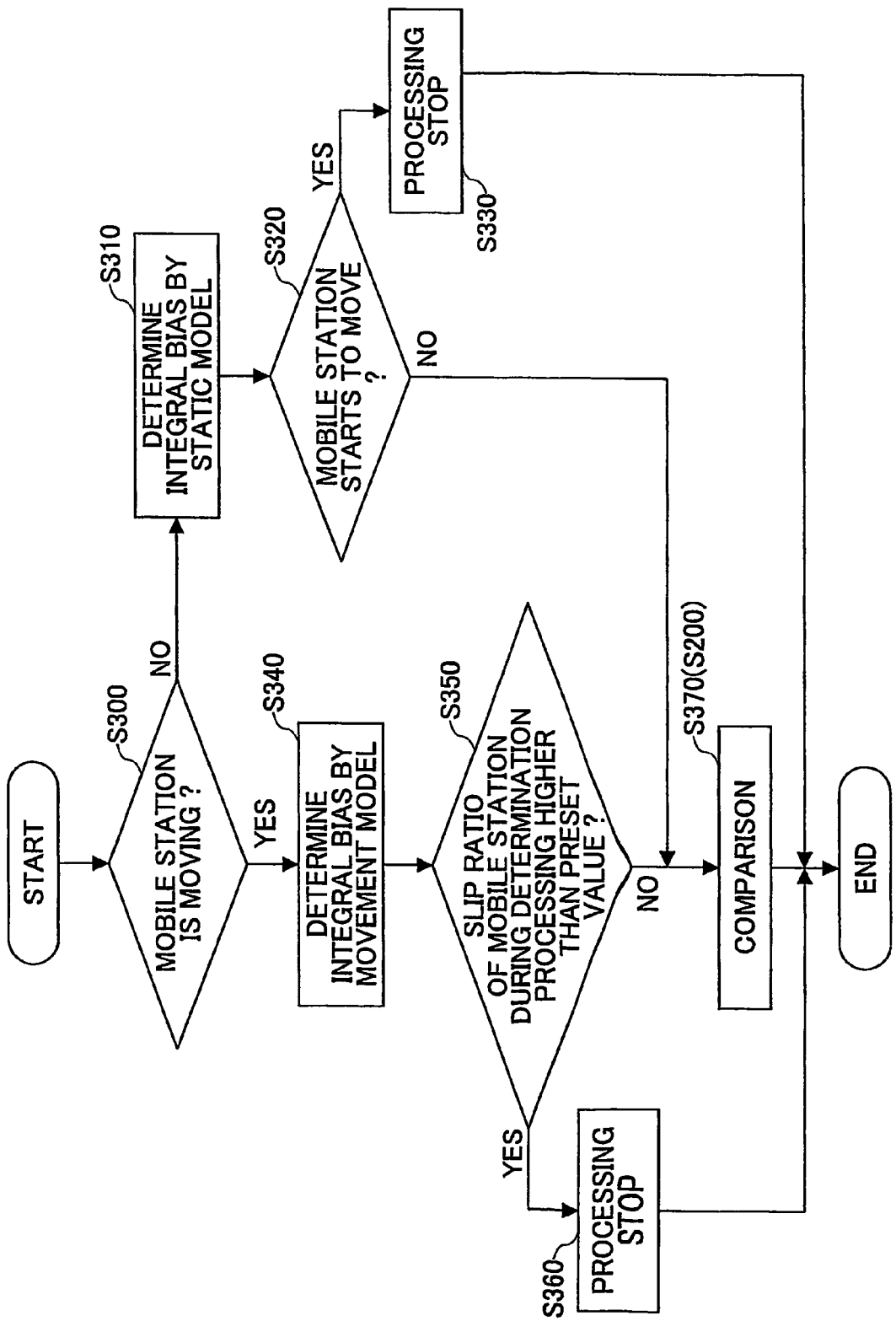

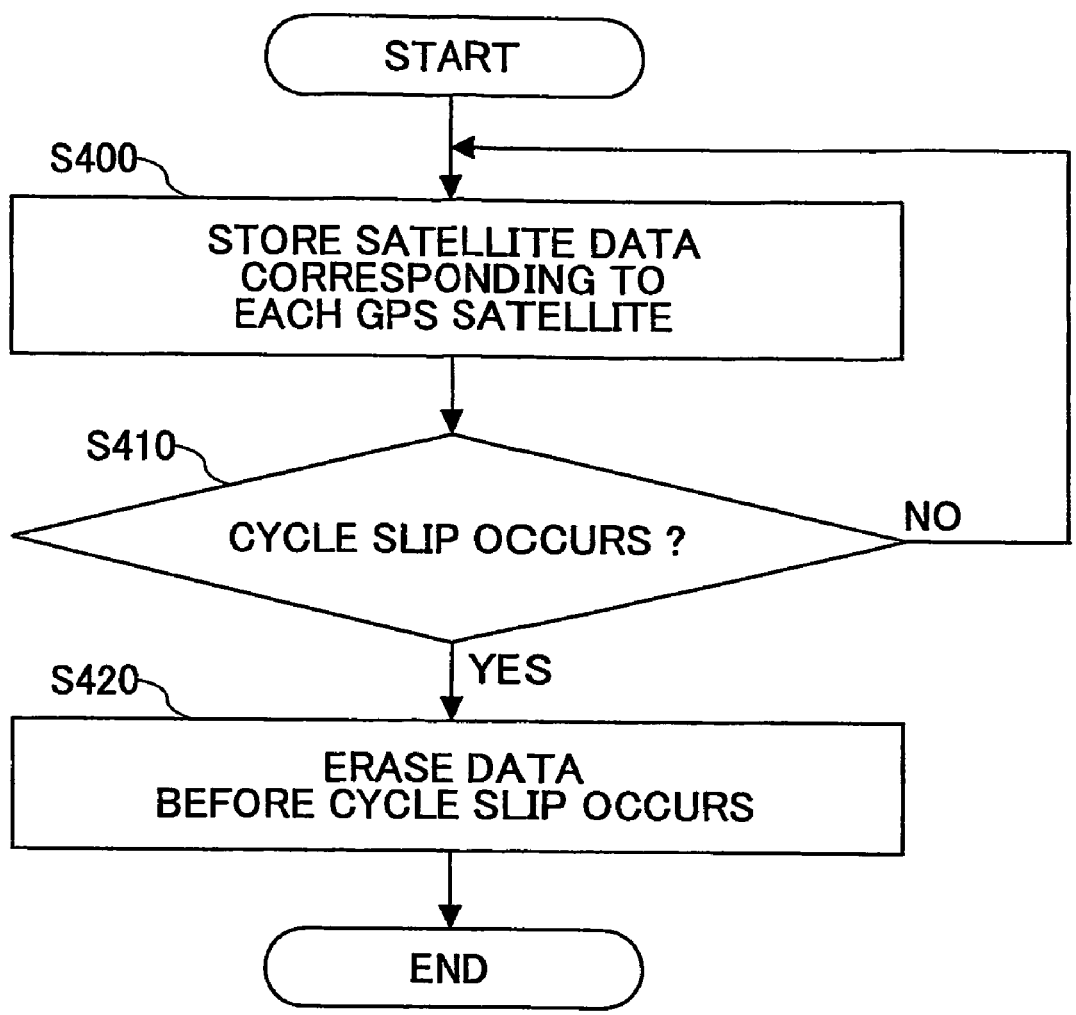

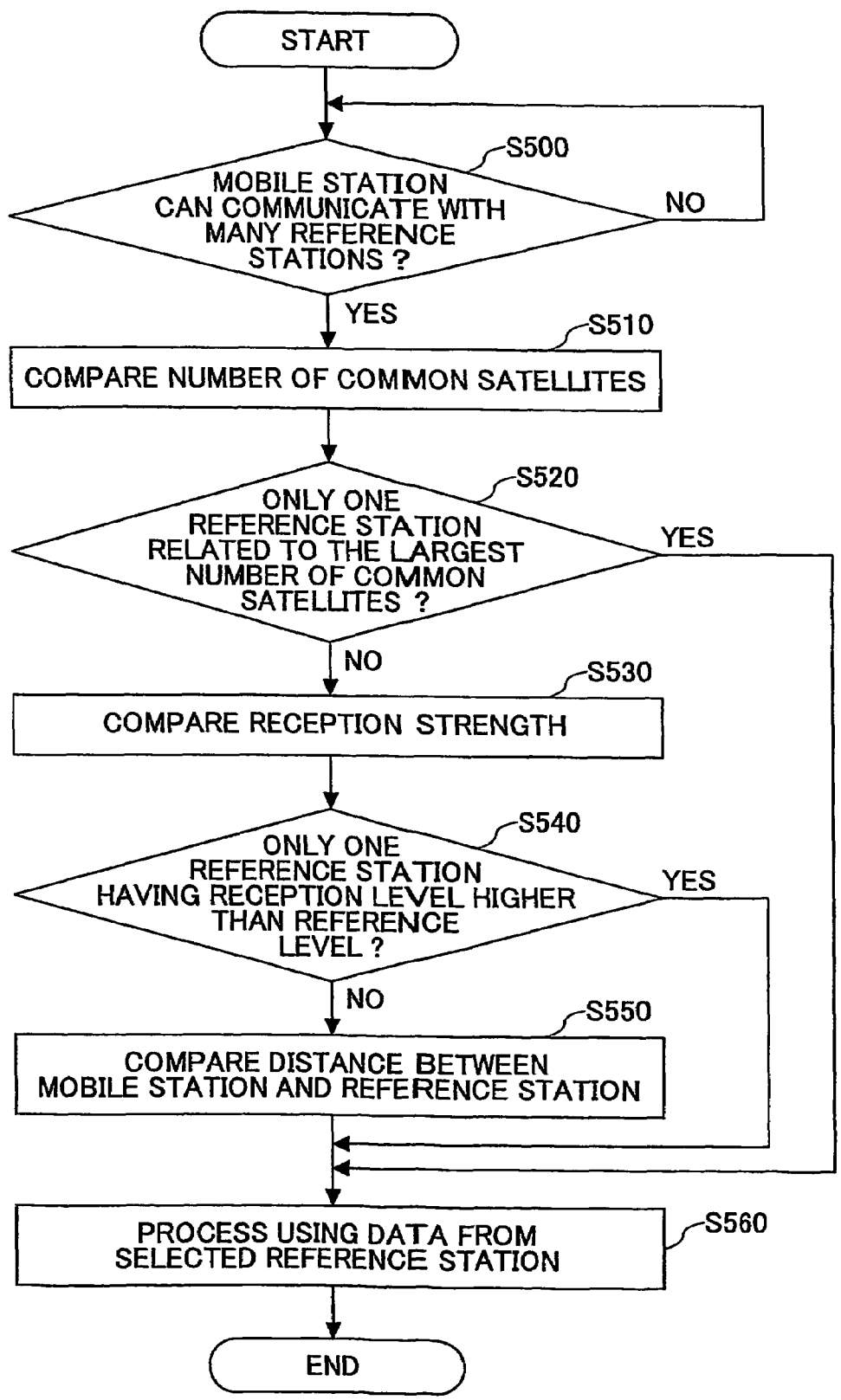

US 7,498,980 B2

CARRIER PHASE GPS POSITIONING DEVICE AND METHOD

TECHNICAL FIELD

The present invention relates to a carrier phase GPS (Global Positioning System) positioning device and method for detecting a position of a mobile station by carrier phase GPS positioning.

BACKGROUND ART

Recently and continuing, carrier phase GPS positioning is widely used in the field of location survey. In the carrier phase GPS positioning, a receiver on a reference side and a receiver on a positioning side simultaneously receive signals from a plural number of satellites, and calculate accumulated values of the carrier phases of the satellite signals at the reference side and the positioning side, separately, resulting in a carrier phase accumulation value (abbreviated as "phase accumulation" if necessary, below). The thus obtained carrier phase accumulation value contains an uncertainty factor that is integral multiple of the wavelength of the carrier. This uncertainty factor is referred to as "integral carrier phase ambiguity", and is often abbreviated as "integer ambiguity".

A technique is well-known that uses a Kalman filter to determine the integer ambiguity. In this technique, a tracking filter is provided which regards the position to be determined and the integer ambiguity as state variables, a double phase difference of the phase accumulation on the positioning side relative to the reference side is an observation quantity, and each time an observation is made the state variables are updated.

There are also other techniques for determining the integer ambiguity. For example, it is known that the integer ambiguity related to a double phase difference can be found by the least-squares method under certain conditions by using the double phase difference of the carrier containing the integer ambiguity.

In the related art, if the electromagnetic wave is interrupted after the integer ambiguity is determined or in the course of the determination (also referred to as "cycle-slip"), for example, the electromagnetic wave cannot be received, one has to determine the integer ambiguity again after reception of the electromagnetic wave resumes. However, because the above techniques of the related art are proposed specifically for positioning (determining the position of) an object which is fixed at a certain position for a long time, re-determination of the integer ambiguity is quite time-consuming.

To solve this problem, there is a known technique in which, after reception of the electromagnetic wave resumes, a search space is established having a radius corresponding to a positional variance with an output position of an IMU (Inertia Measurement Unit) as a center, and the integer ambiguity can be determined from the number of candidates of the integer ambiguity, which are solutions in the search space. For example, Japanese Laid on Patent Publication No. 2001-99919 discloses such a technique.

However, in the above technique, in addition to a RTK positioning device, an IMU is also needed, and one has to calculate the variance of the position measured by the IMU alone when the electromagnetic wave is interrupted. In addition, if the electromagnetic wave is cut off for a long time, the search space expends accordingly, and it is difficult to re-determine the integer ambiguity in a short duration.

DISCLOSURE OF THE INVENTION

Accordingly, it is a general object of the present invention to solve the above problem of the related art.

A specific object of the present invention is to provide a carrier phase GPS positioning device capable of determining and re-determining an integer ambiguity quickly and precisely, a carrier phase GPS positioning method, a carrier phase GPS positioning system, and a reference station.

According to a first aspect of the present invention, there is provided a carrier phase GPS positioning device including a first integer ambiguity estimation unit that combines a plurality of first carrier phase accumulation data in a first duration extracted from data received from a satellite by a reference station at a fixed position, with one or more second carrier phase accumulation data received from the satellite by a mobile station in a second duration shorter than the first duration, and estimates an integer ambiguity included in the second carrier phase accumulation data; and a positioning unit that determines the position of the mobile station using the integer ambiguity estimated by the first integer ambiguity estimation unit.

According to the present invention, because the integer ambiguity is estimated by using sampling data on the mobile station side in the second duration shorter than the first duration, the time up to estimation of the integer ambiguity is shortened. The carrier phase GPS positioning device of the present invention can be implemented as a mobile station receiving data from a reference station, a reference station receiving data from a mobile station, or a device receiving data from both the reference station and the mobile station.

Preferably, abnormal values are excluded from the first carrier phase accumulation data. In addition, when reception of an electromagnetic wave emitted from the satellite is temporarily interrupted, data prior to the interruption is excluded from the first carrier phase accumulation data.

Preferably, the plurality of first carrier phase accumulation data include a plurality of carrier phase accumulation data transmitted from the satellite at a first number of times in the first duration, and the second carrier phase accumulation data in the second duration include a plurality of carrier phase accumulation data transmitted from the satellite at a second number of times in the second duration, and here the second number is less than the first number. More preferably, the second number equals one. In the latter case, single epoch positioning is possible.

In addition, preferably, after the first integer ambiguity estimation unit estimates the integer ambiguity, the positioning unit determines the position of the mobile station using data measured on the mobile station side alone.

Therefore, the amount of communication data between the mobile station and the reference station is greatly reduced after estimation of the integer ambiguity.

In addition, preferably, the carrier phase GPS positioning device further includes a movement quantity detection unit that detects a movement of the mobile station and a movement quantity of the mobile station when the mobile station is moving, a second integer ambiguity estimation unit that, when the mobile station is at rest, estimates the integer ambiguity included in the second carrier phase accumulation data. The estimation is made based on the first carrier phase accumulation data in the period when the mobile station is at rest, and a third integer ambiguity estimation unit that, while the mobile station is moving, estimates the integer ambiguity included in the second carrier phase accumulation data while taking movement detection results into consideration.

According to the present invention, the integer ambiguity estimation units carry out the estimation processing in parallel and independently from each other. Because integer ambiguities independent from each other are estimated, by comparing and investigating the integer ambiguities, an appropriate integer ambiguity can be obtained, and this can increase precision and reliability of the positioning.

As an embodiment, after the second integer ambiguity estimation unit or the third integer ambiguity estimation unit estimates the integer ambiguity, the positioning unit determines the position of the mobile station using the integer ambiguity estimated by the second integer ambiguity estimation unit or the third integer ambiguity estimation unit instead of the integer ambiguity estimated by the first integer ambiguity estimation unit.

Further, if the mobile station is a vehicle having wheels, the movement quantity detection unit detects a movement of the vehicle based on a wheel speed sensor that detects a rotational speed of the wheels. When a slip ratio greater than a predetermined value is detected by at least the wheel speed sensor, the integer ambiguity estimation processing by the third integer ambiguity estimation unit is initialized, and the positioning unit determines the position of the mobile station using the integer ambiguity estimated by the first integer ambiguity estimation unit until the third integer ambiguity estimation unit estimates or re-estimates the integer ambiguity.

But when the integer ambiguity has been estimated by the second integer ambiguity estimation unit, the integer ambiguity estimated by the second integer ambiguity estimation unit may be used for determining the position of the mobile station.

Because the third integer ambiguity estimation unit takes movement quantity detection results into consideration, even when the mobile station is moving, it is possible to estimate the integer ambiguity at high precision.

In addition, preferably, when plural reference stations are present in a communication region, a reference station is selected which is able to communicate with more satellites in common with the satellite communicating with the mobile station, and the first carrier phase accumulation data related to the selected reference station are used. In addition, when there are plural reference stations able to communicate with the same number of satellites, a reference station is selected which has the highest minimum reception strength of signals from the satellites. Further, when plural reference stations, which receive signals from plural common satellites and the signal reception strength of each of the common satellites exceeds a predetermined value, are present in a communication region, a reference station is selected which is closest to the mobile station, and the first carrier phase accumulation data related to the selected reference station are used.

Therefore, even the reference station changes along with the movement of the mobile station, reduction of the integer ambiguity estimation precision is preventable.

The carrier phase GPS positioning device of the above inventions may be installed in the navigation device of a vehicle acting as a mobile station, or other movable objects such as a working robot, a mobile phone, and a PDA, or alternatively, in a facility capable of bi-directional communication with the mobile station.

According to a second aspect of the present invention, there is provided a carrier phase GPS positioning method, including the steps of combining a plurality of first carrier phase accumulation data in a first duration extracted from data received from a satellite by a reference station at a fixed position, with one or more second carrier phase accumulation data received from the satellite by a mobile station in a second duration shorter than the first duration, and estimating an integer ambiguity included in the second carrier phase accumulation data; and determining the position of the mobile station using the estimated integer ambiguity.

According to a third aspect of the present invention, there is provided a carrier phase GPS positioning method including the steps of acquiring a carrier phase accumulation value at one time on the mobile station side; acquiring a plurality of carrier phase accumulation values at a plurality of times prior to the one time on the reference station side; combining the carrier phase accumulation values on the reference station side at the plural times, with a carrier phase accumulation value on the mobile station side at the one time, and estimating an integer ambiguity included in the carrier phase accumulation value of signals transmitted from the satellite received by the mobile station.

According to a fourth aspect of the present invention, there is provided a carrier phase GPS positioning system including a reference station that extracts a plurality of first carrier phase accumulation data in a first duration based on received data from a satellite; a carrier phase GPS positioning device including a first integer ambiguity estimation unit that combines the first carrier phase accumulation data with one or more second carrier phase accumulation data received from the satellite by a mobile station in a second duration shorter than the first duration, and estimates an integer ambiguity included in the second carrier phase accumulation data; a positioning unit that determines the position of the mobile station using the estimated integer ambiguity; and a communication path that enables communication between the carrier phase GPS positioning device and the reference station.

According to a fifth aspect of the present invention, there is provided a reference station that extracts a plurality of first carrier phase accumulation data in a predetermined duration based on received data from a satellite, and transmits the first carrier phase accumulation data to a carrier phase GPS positioning device including an estimation unit that combines the first carrier phase accumulation data with one or more second carrier phase accumulation data received from the satellite by a mobile station in a second duration shorter than the predetermined duration, and estimates an integer ambiguity included in the second carrier phase accumulation data; and a positioning unit that determines the position of the mobile station using the estimated integer ambiguity.

According to a sixth aspect of the present invention, there is provided a reference station including an acquisition unit that acquires a carrier phase accumulation value at one time on a mobile station side; an integer ambiguity estimation unit that combines a plurality of carrier phase accumulation values at a plurality of times prior to the one time on the reference station side with the carrier phase accumulation value on the mobile station side, and estimates an integer ambiguity included in the carrier phase accumulation value on the mobile station side; a positioning unit that determines the position of the mobile station using the integer ambiguity estimated by the integer ambiguity estimation unit; and a transmission unit that transmits the position detected by the positioning unit to the mobile station.

BRIEF DESCRIPTION OF THE DRAWINGS

These and other objects, features, and advantages of the present invention will become more apparent from the following detailed description of preferred embodiments given with reference to the accompanying drawings, in which:

FIG. 7 is a flowchart illustrating an operation of determining the integer ambiguity by the time-series determination method of the related art, which is performed in parallel to the routine in FIG. 5 and/or the routine in FIG. 6;

FIG. 8 is a flowchart illustrating an operation performed in the reference station 20 corresponding to the operation performed in the mobile station 30 as shown in FIG. 5, FIG. 6, and FIG. 7; and FIG. 9 is a flowchart illustrating an operation of the mobile station 30 which is capable of communicating with a number of reference stations 20.

BEST MODE FOR CARRYING OUT THE INVENTION

Below, preferred embodiments of the present invention are explained with reference to the accompanying drawings.

Figure 1:
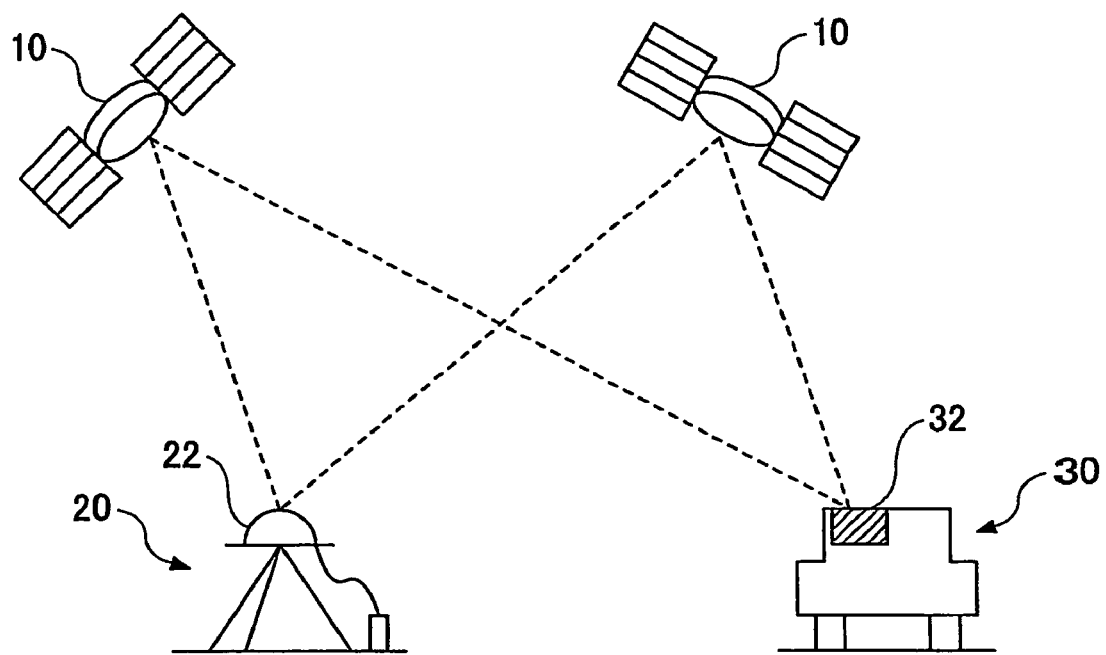
FIG. 1 is a schematic view of a carrier phase GPS positioning device according to the present invention.

FIG. 1 is a schematic view of a carrier-phase GPS positioning system according to the present invention.

As illustrated in FIG. 1, the carrier phase GPS positioning system includes GPS satellites 10 orbiting around the earth, a reference station 20 located at a fixed position (known position), and a mobile station 30 that is on the earth, and is able to move on the earth.

Each of the GPS satellites 10 broadcasts navigation messages to the earth continuously. The navigation messages include orbital information of the corresponding GPS satellite 10, clock correction value, and correction coefficients of the ionospheric layer. The navigation messages are spread using a C/A code, are carried on a L1 carrier (frequency: 1575.42 MHz), and are broadcast toward the earth.

Presently, there are 24 GPS satellites orbiting around the earth at an altitude of 20,000 km in the sky. Every four GPS satellites are equally arranged on one of six orbital planes of the earth, which are inclined by 55 degrees relative to each other. Therefore, at least five satellites are always observable from a position as long as the position is open to the sky, no matter where the position is on the earth.

Figure 2:
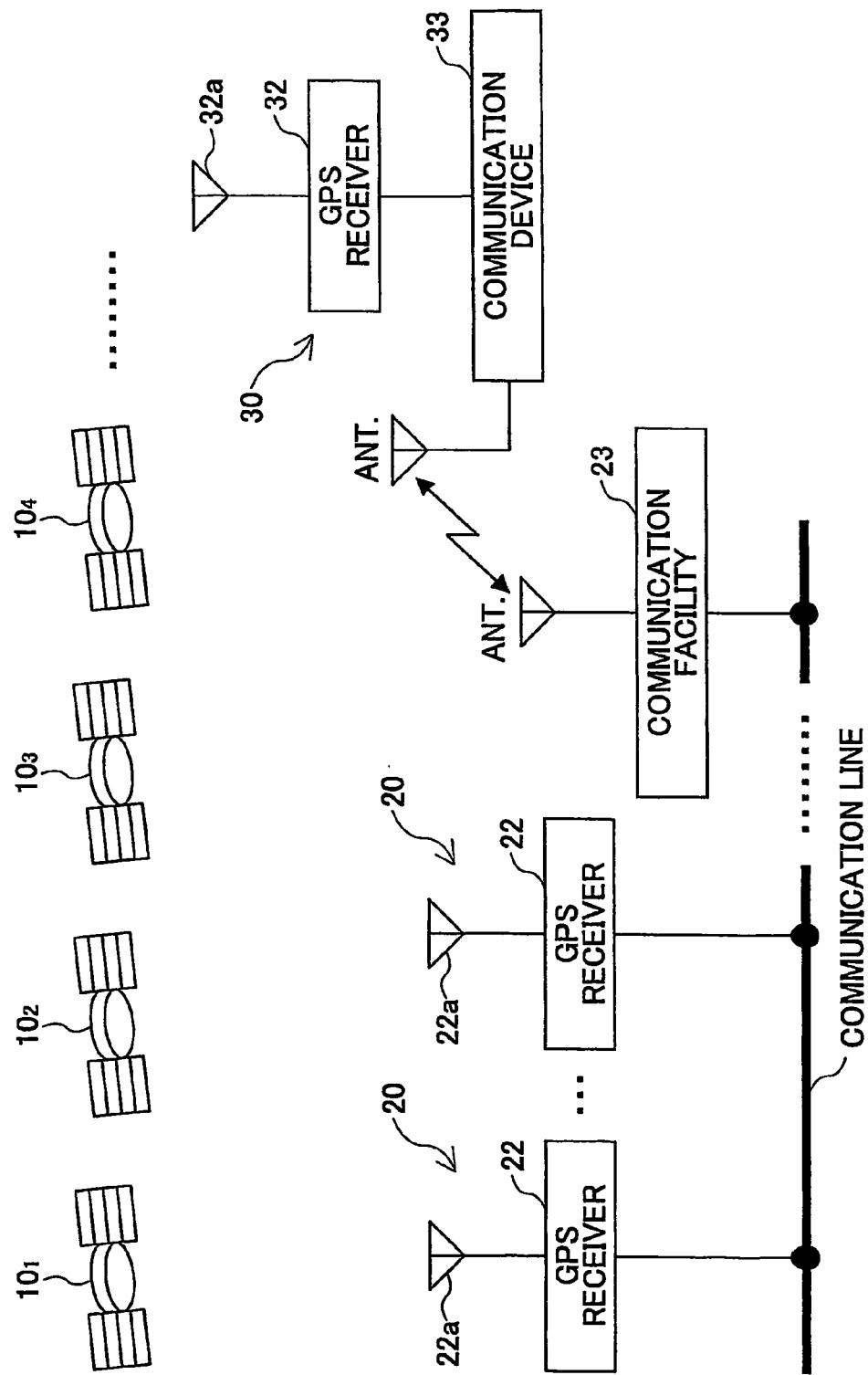
FIG. 2 is a diagram showing a configuration of the carrier phase GPS positioning device in FIG. 1.

FIG. 2 is a diagram showing a configuration of the carrier phase GPS positioning device in FIG. 1.

In FIG. 2, the mobile station 30 has a GPS receiver 32. In the GPS receiver 32, there is an oscillator (not illustrated) having an oscillating frequency equal to the carrier frequency of the GPS satellite 10. The GPS receiver 32 converts an electromagnetic wave, which is emitted from the GPS satellite 10 and is received by the GPS receiver 32 via a GPS antenna 32a, and then performs C/A code synchronization using the C/A codes generated in the GPS receiver 32, and extracts the navigation messages.

The GPS receiver 32 calculates a carrier phase accumulation value $\Phi_{iu}$ of the carrier waves from the GPS satellites $10_i$. Here, in the phase accumulation value $\Phi_{iu}$, the subscript i(=1, 2, ...) represents the numbers assigned to the GPS satellites $10_i$, and the subscript u represents that the accumulation value is calculated on the side of the mobile station 30.

The phase accumulation value $\Phi_{iu}$ can be described as the difference between a phase $\Theta_{iu}(t)$ of the oscillator at the time t of receiving the carrier wave and a phase $\Theta_{iu}(t-\tau)$ of the carrier wave when the satellite signal from the GPS satellite $10_i$ is generated, as shown by the following formula (1).

$$\Phi_{iu}(t)=\Theta_{iu}(t)-\Theta_{iu}(t-\tau_u)+N_{iu}+\epsilon_{iu}(t) \quad (1)$$

Here, $\tau_u$ represents travel time from the GPS satellite 10 to the GPS receiver 32, and $\epsilon_{iu}$ represents noise (uncertainty). Further, at the time when starting observing the phase difference, the GPS receiver 32 can accurately determine the carrier phase within one wavelength of the carrier wave, but cannot determine what number of wavelengths the present wavelength is. For this reason, in the phase accumulation value $\Phi_{iu}(t)$, as shown in the formula (1), there is an uncertainty factor $N_{iu}$, known as "integer ambiguity".

The mobile station 30 also includes a communication device 33, such as a mobile phone. As described below, the communication device 33 is capable of communicating with a communication facility 23 installed on the reference station 20 side, such as a base station for mobile phones, by bi-directional communication.

A GPS receiver 22 having a GPS antenna 22a is installed in the reference station 20. The GPS receiver 22, the same as the GPS receiver 32 in the mobile station 30, calculates a carrier phase accumulation value $\Phi_{ib}$ at time t based on the carrier waves from the GPS satellites $10_i$, as shown by the following formula (2).

$$\Phi_{ib}(t)=\Theta_{ib}(t)-\Theta_{ib}(t-\tau_b)+N_{ib}+\epsilon_{ib}(t) \quad (2)$$

Here, $N_{ib}$ is an integer ambiguity, and $\epsilon_{ib}$ represents noise (uncertainty). In the phase accumulation value $\Phi_{ib}$, the subscripts b represents that the accumulation value is calculated on the side of the reference station 20.

The reference station 20 transmits the obtained carrier phase accumulation value $\Phi_{ib}$ to the mobile station 30 via the communication facility 23. More than one reference stations 20 may be installed in a specified region. As illustrated in FIG. 2, each of the reference stations 20 may be connected to one or more communication facilities 23 through Internet or other networks, or a communication facility 23 may be installed in each of the reference stations 20. In the former case, as long as the mobile station 30 is able to communicate with the communication facility 23, the mobile station 30 can obtain the information received by each of the reference stations 20.

Figure 3:
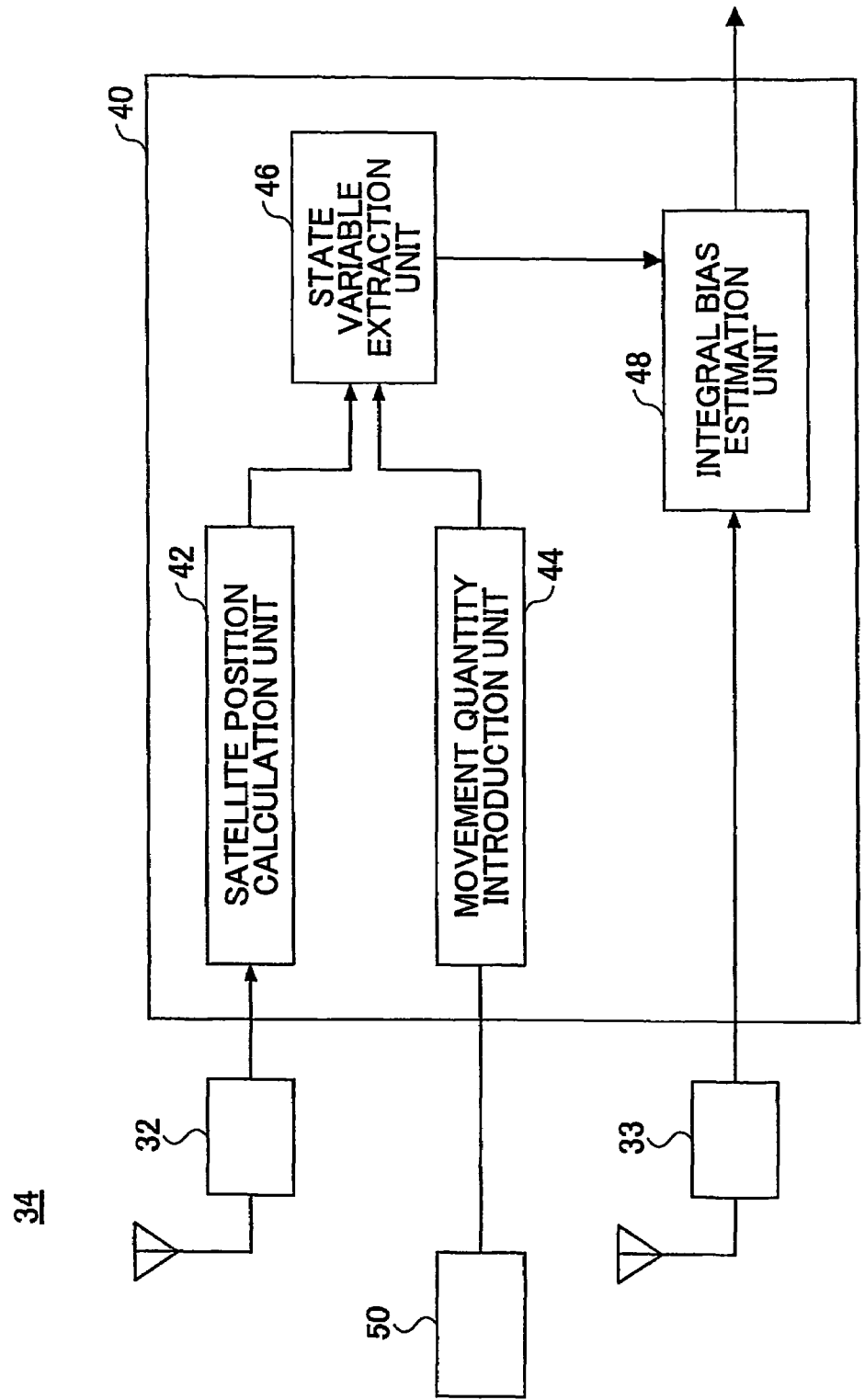
FIG. 3 is a block diagram showing an embodiment of a carrier phase GPS positioning device 34 installed in the mobile station 30 according to the present invention.

FIG. 3 is a block diagram showing an embodiment of a carrier phase GPS positioning device 34 installed in the mobile station 30 according to the present invention.

The carrier phase GPS positioning device 34 of the present embodiment includes a calculation unit 40, which is connected to the GPS receiver 32 and the communication device 33, and further, to various sensors 50 in the mobile station 30. The calculation unit 40 may also be installed in the GPS receiver 32. When the mobile station is a vehicle, the GPS receiver 32, the calculation unit 40 and/or the communication device 33 may also be mounted in a navigation device.

The calculation unit 40 may be formed from a microcomputer, and may include a satellite position calculation unit 42, a movement quantity introduction unit 44, a state variable extraction unit 46, and an integer ambiguity estimation unit 48, as illustrated in FIG. 3.

The satellite position calculation unit 42, based on the orbital information in the navigation messages received by the GPS receiver 32, calculates positions ($X_i(t), Y_i(t), Z_i(t)$) of all observable GPS satellites $10_i$ at time t in a world coordinate system.

Figure 4:
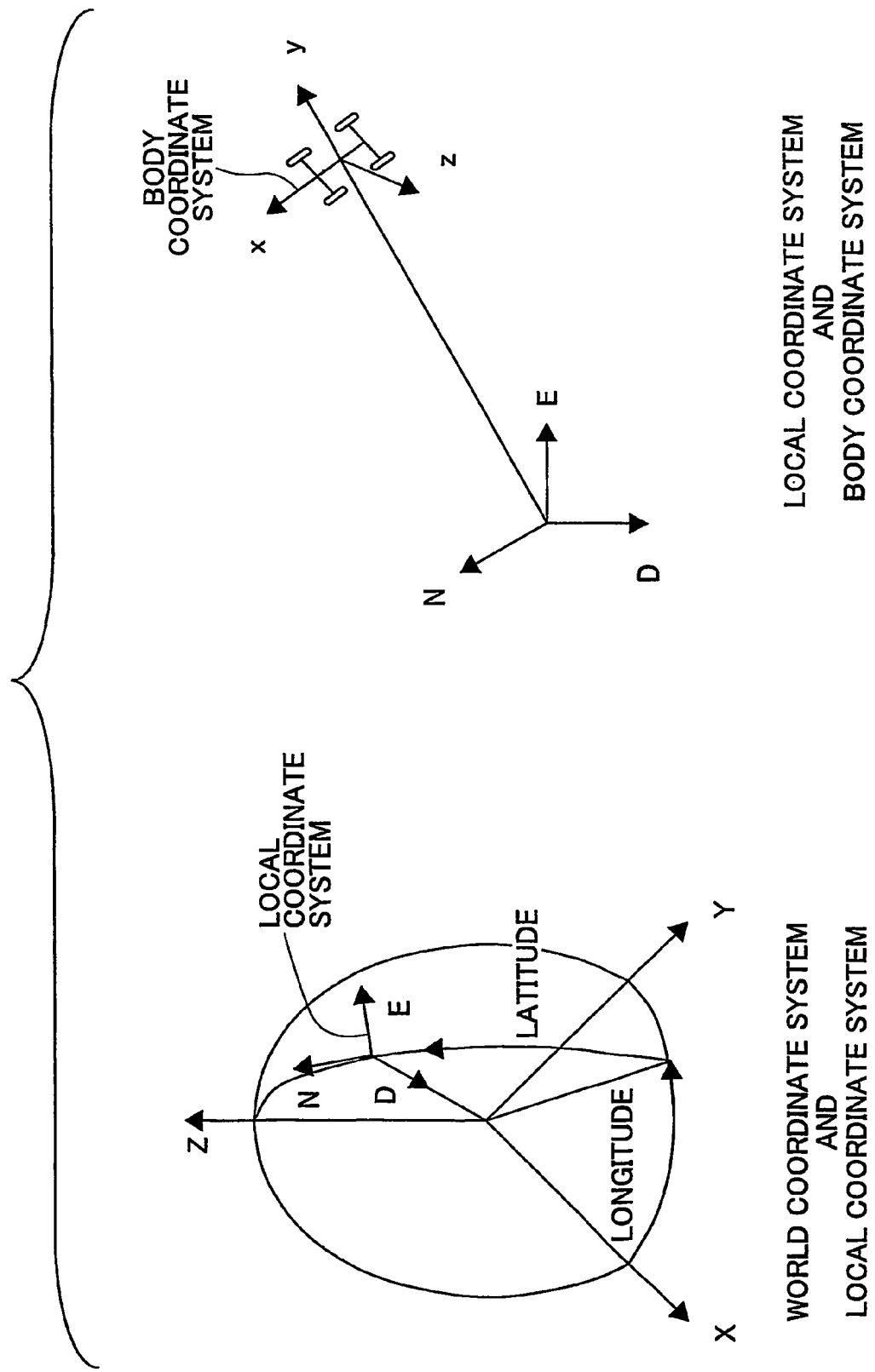
FIG. 4 is a view illustrating the definitions of coordinate systems used in descriptions.

FIG. 4 is a view illustrating the definitions of coordinate systems used in the following description.

FIG. 4 shows relations between the world coordinate system, a local coordinate system, and a body coordinate system.

As illustrated in FIG. 4, in the world coordinate system, the origin is defined to be at the center of gravity of the earth, the X axis and Y axis, which are perpendicular to each other, are in the equatorial plane, and the Z axis is perpendicular to the X axis and Y axis.

The body coordinate system is defined on the body of the vehicle.

Because movement of each of the GPS satellites 10 is confined to an orbital plane passing through the center of gravity of the earth, and the orbit of each of the GPS satellites 10 is an ellipse with the center of gravity of the earth as a focus, positions of each of the GPS satellites 10 in the orbital plane can be calculated by successive numerical solutions of Kepler's equation.

Because the orbital planes of each of the GPS satellites and the equatorial plane in the world coordinate system satisfy a rotational transformation relation, positions ($X_i(t), Y_i(t), Z_i(t)$) of the GPS satellites 10 at the time t of receiving the carrier waves can be calculated by three dimensional rotational coordinate transformation of the positions of the GPS satellites 10 on the orbital planes.

The movement quantity introduction unit 44, based on the output signals of the various sensors 50 input periodically, calculates quantities related to movement of the mobile station 30, and outputs the results to the state variable extraction unit 46.

For example, if the mobile station 30 is a vehicle, the movement quantity introduction unit 44 calculates the speed Vx (t) (speed in the forward and backward direction) and Vy (t) (speed in the right and left direction) at the time t of receiving the carrier wave based on output signals from various sensors 50, for example, two wheel speed sensors mounted on the driven wheels of the vehicle, a yaw rate sensor, a left and right G acceleration sensor, an azimuth meter.

Because the speed vector (Vx (t), Vy (t)) of the vehicle is defined in the body coordinate system, whose origin is on the body of the vehicle, it is necessary for the movement quantity introduction unit 44 to transform the speed vector (Vx (t), Vy (t)) from the body coordinate system to the world coordinate system via the local coordinate system. Usually, the rotational transformation of coordinates can be performed by using Euler angles. In the present embodiment, the transformation from the body coordinate system to the local coordinate system is performed using only a yaw angle $\phi(t)$ since the roll angle and pitch angle are small. Depending on the situation, the roll angle and pitch angle may also be considered, or the yaw angle may also be ignored. The transformation from the local coordinate system to the world coordinate system is performed by using the longitude $\phi(t)$ and latitude $\lambda(t)$ of the position of the vehicle.

Specifically, assume the position of the vehicle in the world coordinate system is ($X_u, Y_u, Z_u$), and the longitude and latitude of the position of the vehicle is ($\phi, \lambda$), the speed vector of the vehicle in the world coordinate system $d/dt[X_u, Y_u, Z_u]$ can be expressed by the following formula (3).

$$d/dt[X_u, Y_u, Z_u]^T = rot(\phi,\lambda)*rot(\phi)*[Vx, Vy] \quad (3)$$

Here, [ ]$^T$ means transpose of a matrix, rot($\phi,\lambda$) and rot($\phi$) are defined as the following formulae (4) and (5).

$$rot(\phi, \lambda) = \begin{bmatrix} -\cos\phi\sin\lambda & -\sin\phi \\ -\sin\phi\sin\lambda & \cos\phi \\ \cos\lambda & 0 \end{bmatrix} \quad (4)$$

$$rot(\varphi) = \begin{bmatrix} \cos\varphi & -\sin\varphi \\ \sin\varphi & \cos\varphi \end{bmatrix} \quad (5)$$

The longitude $\phi(t)$ and latitude $\lambda(t)$ of the position of the vehicle may be known (fixed longitude and latitude of a specified location which has been already determined, or may be separately measured variable longitude and latitude of the moving vehicle (that is, the mobile station 30).

The yaw angle $\phi(t)$ may be calculated by integrating a yaw angular speed (the output signal of the yaw rate sensor), or may be determined by using an azimuth meter.

In the above formula (3), by using input quantities U01, U02, and U03 on the right side, and expressing the formula in a discrete way, one obtains the following formulae (6), (7), (8).

$$X_u(t_n) = X_u(t_{n-1}) + DT*U01 \quad (6)$$

$$Y_u(t_n) = Y_u(t_{n-1}) + DT*U02 \quad (7)$$

$$Z_u(t_n) = Z_u(t_{n-1}) + DT*U03 \quad (8)$$

Therefore, the final known input is expressed as below.

$$U = [DT*U01, DT*U02, DT*U03]^T \quad (9)$$

In formulae (6), (7), (8), and (9), DT represents a sample time interval (data updating interval), and satisfies $t_n = t_{n-1} +$ DT. Below, for simplicity of explanation, it is assumed that the sample time interval DT equals a period of calculating the phase accumulation value by the GPS receivers 22 and 32.

The integer ambiguity estimation unit 48 estimates the integer ambiguity by using two types of carrier phase accumulation values, that is, the carrier phase accumulation value $\Phi_{ib}$ on the side of the reference station 20, which is received by the mobile station 30 through the communication device 33, and the carrier phase accumulation value $\Phi_{iu}$ on the side of the mobile station 30.

Specifically, a double phase difference of the phase accumulation of the GPS satellites $10_j$ and $10_h$ (j is not equal to h) at time t can be expressed by the following formula (10).

$$\Phi_{jhbu} = (\Phi_{jb}(t) - \Phi_{ju}(t)) - (\Phi_{hb}(t) - \Phi_{hu}(t)) \quad (10)$$

On the other hand, because the distance between the GPS satellite $10_j$ and the GPS receiver 22 or 32 equals the wavelength L of the carrier wave multiplied by the phase accumulation value, the double phase difference $\Phi_{jhbu}$ of the phase accumulation satisfies the following formula (11).

$$\Phi_{jhbu} = [\{\sqrt{(X_b(t) - X_j(t))^2 + (Y_b(t) - Y_j(t))^2 + (Z_b(t) - Z_j(t))^2} - \sqrt{(X_u(t) - X_j(t))^2 + (Y_u(t) - Y_j(t))^2 + (Z_u(t) - Z_j(t))^2}\} - \{\sqrt{(X_b(t) - X_h(t))^2 + (Y_b(t) - Y_h(t))^2 + (Z_b(t) - Z_h(t))^2} - \sqrt{(X_u(t) - X_h(t))^2 + (Y_u(t) - Y_h(t))^2 + (Z_u(t) - Z_h(t))^2}\}] / L + N_{jhbu} + \varepsilon_{jhbu} \quad (11)$$

In formula (11), [$X_b(t), Y_b(t), Z_b(t)$] are coordinates (known) of the reference station 20 at time t in the world coordinate system, and [$X_u(t), Y_u(t), Z_u(t)$] are coordinates (unknown) of the mobile station 30 at time t, $[X_j(t), Y_j(t), Z_j(t)]$ and $[X_h(t), Y_h(t), Z_h(t)]$ are coordinates of the GPS satellites $10_j$ and $10_h$ at time t calculated by the satellite position calculation unit 42. $N_{jhbu}$ represents the double phase difference of the integer ambiguity, that is, $N_{jhbu} = (N_{jb} - N_{ju}) - (N_{hb} - N_{hu})$.

The integer ambiguity estimation unit 48 deduces double phase differences $\Phi_{jhbu}$ by using the formula (10) for each of four or more combinations of two GPS satellites $10_j$ and $10_h$, thereby obtaining relations satisfying the formula (11) by substituting the deduced double phase differences $\Phi_{jhbu}$ into the formula (11). For example, when five GPS satellites $10_1$ to $10_5$ are observable, with the GPS satellite $10_1$ as a reference satellite, $\Phi_{12bu}$, $\Phi_{13bu}$, $\Phi_{14bu}$, $\Phi_{15bu}$ are substituted into the formula (11) and four relations are obtained.

In this way, from the time of starting signal reception and periodically thereafter, that is, at time $t=t_1, t_2, \ldots t_n$, the integer ambiguity estimation unit 48 deduces the double phase differences $\Phi_{jhbu}$ by using the formula (10) and gives relations satisfying the formula (11) at each time of $t_1, t_2, \ldots t_n$. Then, the integer ambiguity estimation unit 48 calculates the variance of $\epsilon_{jhbu}$ on many data samples over a long time period (from $t_1$ to $t_n$), for example, by the Kalman filter, least squares method or other estimation techniques, and determines integer ambiguities $N_{ju}$, $N_{hu}$ (this processing is described below in detail with reference to FIG. 7). In other words, the integer ambiguity estimation unit 48 needs to store the double phase differences $\Phi_{jhbu}$ at each time before the integer ambiguities $N_{ju}$, $N_{hu}$ are determined. Further, the integer ambiguities $N_{ju}$, $N_{hu}$ related to the reference station 20 have already been determined on the side of the reference station 20, and are known quantities. The integer ambiguity estimation unit 48 acquires the integer ambiguities $N_{ju}$, $N_{hu}$ related to the reference station 20 by communications. After the integer ambiguities $N_{ju}$, $N_{hu}$ are determined, by well-known interferometric positioning methods, accurate coordinates of the mobile station 30 can be deduced.

In practical measurements, however, because of interruption of the electromagnetic wave, the communication between the GPS satellite $10_i$ and the GPS receivers 22 or 32 may be interrupted sometimes. In this case, it is necessary to re-determine the integer ambiguity, and it is desired that the re-determination of the integer ambiguity be completed in a time period as short as possible.

However, in the aforementioned method, many data samples over a long time period from $t_1$ to $t_n$ are needed to determine the integer ambiguity, and hence the re-determination of the integer ambiguity is quite time-consuming, for example, 60 seconds or so. This problem occurs not only when communication with the GPS satellite is interrupted during measurements, but also at the time when the measurement is started.

In contrast, by the method of determining the integer ambiguity of the present embodiment, as described below, it is possible to re-determine the integer ambiguity in a short time.

Below, the method of determining the integer ambiguity of the present embodiment is explained with reference to the accompanying drawings. For clarity, the aforementioned method is referred to as "time-series determination method" to be distinguished from the method of the present embodiment.

Figure 5:
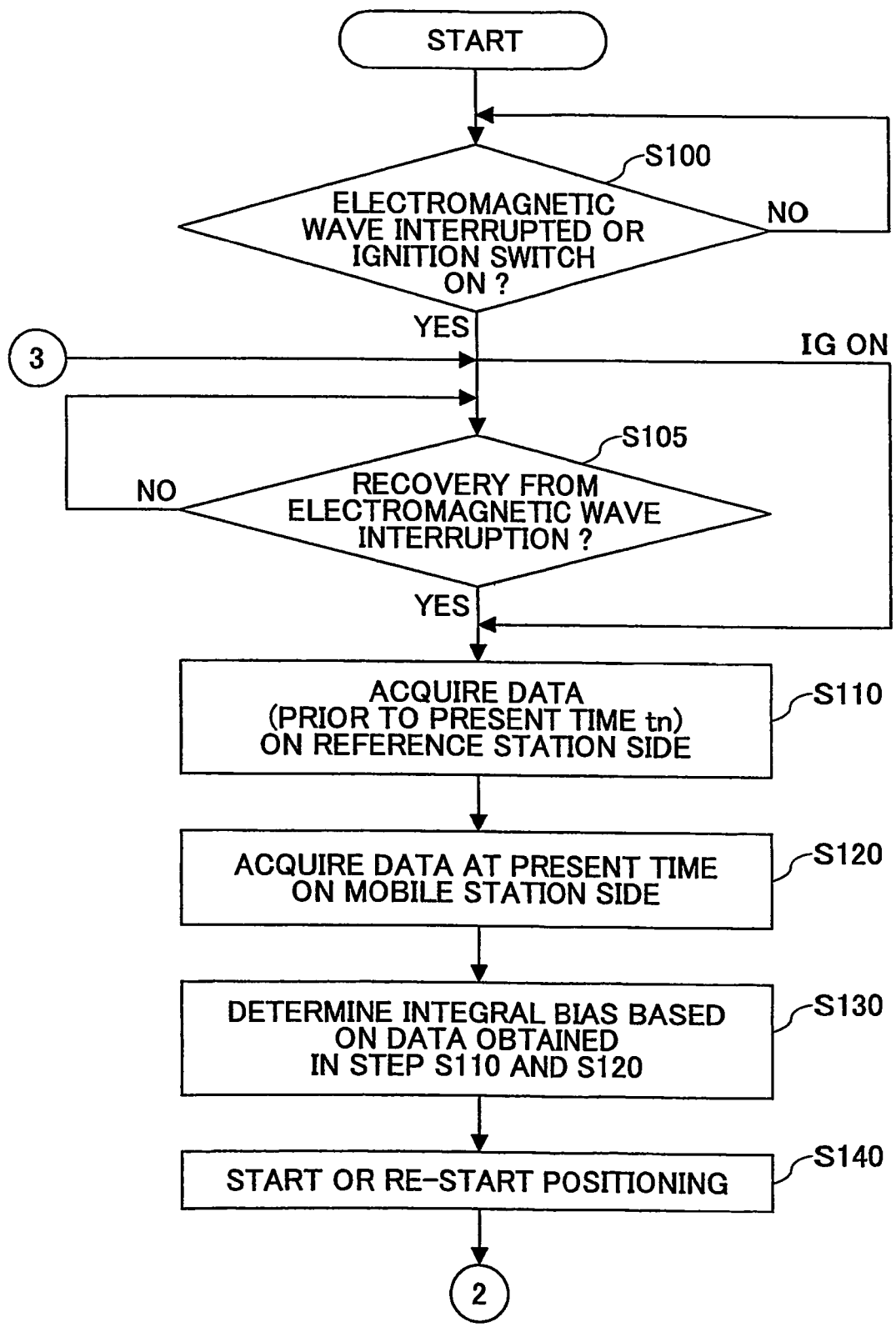
FIG. 5 is a flowchart illustrating the method of determining the integer ambiguity in the carrier phase GPS positioning device 34 according to the present embodiment.

FIG. 5 is a flowchart illustrating the method of determining the integer ambiguity in the carrier phase GPS positioning device 34 (specifically, the integer ambiguity estimation unit 48) according to the present embodiment. It is assumed that in addition to the routine in FIG. 5, the integer ambiguity estimation unit 48 is able to execute processing in the time-series determination method and processing of calculating the position of the mobile station 30 after the integer ambiguity is determined.

In step S100, when the electromagnetic wave is interrupted, or when the ignition switch of the vehicle is switched ON, the routine in FIG. 5 is initiated. Here, "electromagnetic wave interruption" means a state in which the GPS receiver 32 in the mobile station 30 can no longer receive signals required for positioning from the GPS satellites 10 (that is, the phase accumulation value becomes discontinuous, also referred to as "cycle-slip"). In this case, it is substantially not possible to execute processing in the aforesaid time-series determination method and processing of calculating the position of the mobile station 30 after the integer ambiguity is determined.

In step S105, if the electromagnetic wave is interrupted, the routine proceeds to step 110 after the reception of signals from the GPS satellites 10 is resumed (in this example, assume the timing of proceeding to step 110 is $t=t_n$).

If the ignition switch of the vehicle is switched ON, the routine proceeds to step 110 immediately.

In step S110, the phase accumulations $\Phi_{ib}(t_{n-a}), \ldots, \Phi_{ib}(t_n)$ prior to $t=t_n$ (here, from $t_{n-a}$ to $t_n$), which are calculated on the side of the reference station 20, are input to the integer ambiguity estimation unit 48. For example, these data may be acquired by sending an appropriate request signal from the mobile station 30. Alternatively, if the mobile station 30 is continuously receiving signals from the reference station 20, the integer ambiguity estimation unit 48 may read these data from a memory in the mobile station 30. In the latter case, the phase accumulation data prior to the present time, that is, $\Phi_{ib}(t_{n-a}), \ldots, \Phi_{ib}(t_{n-1})$ may also be read out.

In the step S120, at the time t when the signal reception is resumed (in this example, assume $t=t_n$), the phase accumulation value $\Phi_{iu}(t_n)$ on the side of the mobile station 30 is input to the integer ambiguity estimation unit 48.

In the step S130, the integer ambiguity estimation unit 48 determines or re-determines the integer ambiguity based on the phase accumulation values obtained in the step S110 and S120. In this step, a method is employed to determine the integer ambiguity, which is different from the aforesaid time-series determination method in combinations of the phase accumulation values $\Phi$ used in deduction of the double phase differences of the phase accumulation values.

Specifically, in the step S130, for example, the double phase differences $\Phi_{jhbu}$ related to two GPS satellites $10_j$ and $10_h$ (j is not equal to h) can be deduced by using the following formula (12).

$$\Phi_{jhbu} = (\Phi_{jb}(t_k) - (\Phi_{ju}(t_n)) - (\Phi_{hb}(t_k) - \Phi_{hu}(t_n)) \tag{12}$$

In detail, in formula (12), the phase accumulation values $\Phi_{ib}(t_{n-a}), \ldots, \Phi_{ib}(t_n)$, which are obtained in step S110, are substituted into $\Phi_{jb}(t_k)$, respectively, and the phase accumulation values $\Phi_{hb}(t_{n-a}), \ldots, \Phi_{hb}(t_n)$ obtained in step S110 are substituted into $\Phi_{jb}(t_k)$, respectively. Thus, at time $t=t_n$, a plural number of double phase differences $\Phi_{jhbu}$ are generated (in this example, a number of a+1 double phase differences are generated). The $\Phi_{ju}(t_n)$ and $\Phi_{hu}(t_n)$ in formula (12) are the phase accumulation values $\Phi_{ju}(t_n)$ and $\Phi_{hu}(t_n)$ at time $t=t_n$ obtained in step S120.

Accordingly, a+1 equations are obtained by substitution into formula (11). In formula (11), the known coordinates of the reference station 20 at time $t_{n-a}$ to $t_n$ are substituted into $[X_b(t), Y_b(t), Z_b(t)]$, the known coordinates of the GPS satellites $10_j$ and $10_h$ at time $t_{n-a}$ to $t_n$ are substituted into $[X_j(t), Y_j(t), Z_j(t)]$ and $[X_h(t), Y_h(t), Z_h(t)]$ with respect to the reference station 20, respectively, known coordinates of the GPS satellites $10_j$ and $10_h$ at the time of $t_n$ (that is, $[X_j(t_n),Y_j(t_n),Z_j(t_n)]$ and $[X_h(t_n),Y_h(t_n),Z_h(t_n)]$) are always substituted into $[X_j(t), Y_j(t),Z_j(t)]$ and $[X_h(t),Y_h(t),Z_h(t)]$ with respect to the mobile station 30, respectively, and $[X_u(t),Y_u(t),Z_u(t)]$ are always the coordinates (unknown) of the mobile station 30 at $t=t_n$.

These descriptions can be generally expressed by the following equation (13).

$$\Phi_{jhbu} = \left[\left\{\sqrt{\begin{array}{c}X_b(t_k) - X_j(t_k))^2 + (Y_b(t_k) - \\ Y_j(t_k))^2 + (Z_b(t_k) - Z_j(t_k))^2\end{array}} - \right.\right.$$

$$\sqrt{\begin{array}{c}X_u(t_n) - X_j(t_n))^2 + (Y_u(t_n) - \\ Y_j(t_n))^2 + (Z_u(t_n) - Z_j(t_n))^2\end{array}}\right\} -$$

$$\left\{\sqrt{\begin{array}{c}X_b(t_k) - X_h(t_k))^2 + (Y_b(t_k) - \\ Y_h(t_k))^2 + (Z_b(t_k) - Z_h(t_k))^2\end{array}} - \right.$$

$$\left.\left.\sqrt{\begin{array}{c}X_u(t_n) - X_h(t_n))^2 + (Y_u(t_n) - \\ Y_h(t_n))^2 + (Z_u(t_n) - Z_h(t_n))^2\end{array}}\right\}\right]/L +$$

$$N_{jhbu} + \varepsilon_{jhbu}(t_k = t_{n-a}, \ldots, t_n)$$

(11)

Then, the integer ambiguity estimation unit 48 calculates the variance of $\varepsilon_{jhbu}$ using these data, for example, by the Kalman filter, least squares method or other estimation techniques to determine the integer ambiguities $N_{ju}$, $N_{hu}$.

It should be noted that in the method described in the present embodiment, the data after the time $t=t_n$ are not necessary, and the integer ambiguity can be determined at the time when reception of signals is resumed or started. Hence, single epoch positioning is possible. Due to this, it is possible to quickly (instantaneously) start or resume positioning at the time of starting the vehicle or after recovery from the cycle slip.

In addition, because the integer ambiguity is an integer, in step S130, the integer ambiguity can be obtained by finding the integer solutions (that is, wave number) closest to the real solutions obtained by the Kalman filter. For example, the LA-MBDA can be used for this purpose, which un-correlates the integer ambiguities, and narrows the searching space of the integer solutions so as to facilitate finding the solutions.

After the integer ambiguities are determined, in step S140, positioning is started or re-started by well-known interferometric positioning methods (for example, kinematic positioning (RTK-GPS positioning algorithm)), and accurate coordinates of the mobile station 30 can be deduced. The position of the mobile station 30 obtained in this way may be used in various controls or be presented as information, for example, they may be output and displayed on a screen of a navigation device, or displayed in a map shown in a screen of a mobile phone.

As described above, according to the present embodiment, the integer ambiguity can be determined by combining data on the side of the mobile station 30 at a certain time and data on the side of the reference station 20 prior to the certain time. Therefore, it is possible to quickly (instantaneously) start or resume positioning at the time of starting the vehicle or after recovery from the cycle slip.

In addition, in the routine illustrated in FIG. 5, it is not always necessary to obtain all the phase accumulation values from $t_{n-a}$ to $t_n$ from the reference station 20, but some of the phase accumulation values may be absent. In other words, as long as a sufficiently reliable integer ambiguity can be obtained in step S130, the number of the phase accumulation values obtained from the reference station 20 can be any number.

In addition, in the routine illustrated in FIG. 5, instead of obtaining the phase accumulation values from the reference station 20, variance data of the phase accumulation values may be obtained. For example, If the covariance matrix created by the integer ambiguity estimation unit 48 in step 130 can be created on the side of the reference station 20 (for this purpose, it is necessary to transmit the phase accumulation value $\Phi_{iu}(t_n)$ to the reference station 20), the covariance matrix may be transmitted from the reference station 20 to the mobile station 30. From the same point of view, the mobile station 30 may transmit the covariance matrix to the reference station 20, the processing in step 130 and position calculation of the mobile station 30 may be executed on the side of the reference station 20, and the reference station 20 sends only the integer ambiguity and/or the position of the mobile station 30 to the mobile station 30. In this case, the processing load of the mobile station 30 can be greatly reduced, and the amount of communication data between the reference station 20 and the mobile station 30 can be greatly reduced.

In addition, in the routine illustrated in FIG. 5, it is exemplified that there is only one phase accumulation value ($\Phi_{iu}(t_n)$) on the side of the mobile station 30, which is used for determining the integer ambiguity, but the number of the phase accumulation values on the side of the mobile station 30 may be more than one, and two or more phase accumulation values (less than a+1 in the above example) can be used in the same manner. For example, when using data after the time $t=t_n$, although the time required for determining the integer ambiguity increases, many combinations can be obtained even with a small number of the phase accumulation values obtained from the reference station 20, and similarly, it is possible to determine a sufficiently reliable integer ambiguity.

In addition, in the routine illustrated in FIG. 5, for example, when five GPS satellites $10_1$ to $10_5$ are observable, and the cycle-slip occurs in the GPS satellite $10_2$, it is not necessary to carry out the processing of re-determination of the integer ambiguity for GPS satellites other than GPS satellite $10_2$. In this case, for example, for the double phase difference $\Phi_{12bu}$ of the phase accumulation values, the aforementioned formulae (12) and (13) can be used by using $\Phi_{1u}(t_n)$, $\Phi_{2u}(t_n)$. For the other double phase differences ($\Phi_{13bu},\Phi_{14bu},\Phi_{15bu}$) of the phase accumulation values, the aforementioned formulae (10) and (11) can be used by using $\Phi_{1u}(t_{n-a}), \ldots, \Phi_{1u}(t_n)$, $\Phi_{3u}(t_{n-a}), \ldots \Phi_{3u}(t_n)$. In this case, estimation of the integer ambiguities $N_{ju}$, $N_{hu}$ is performed by using a combination of these data.

Figure 6:
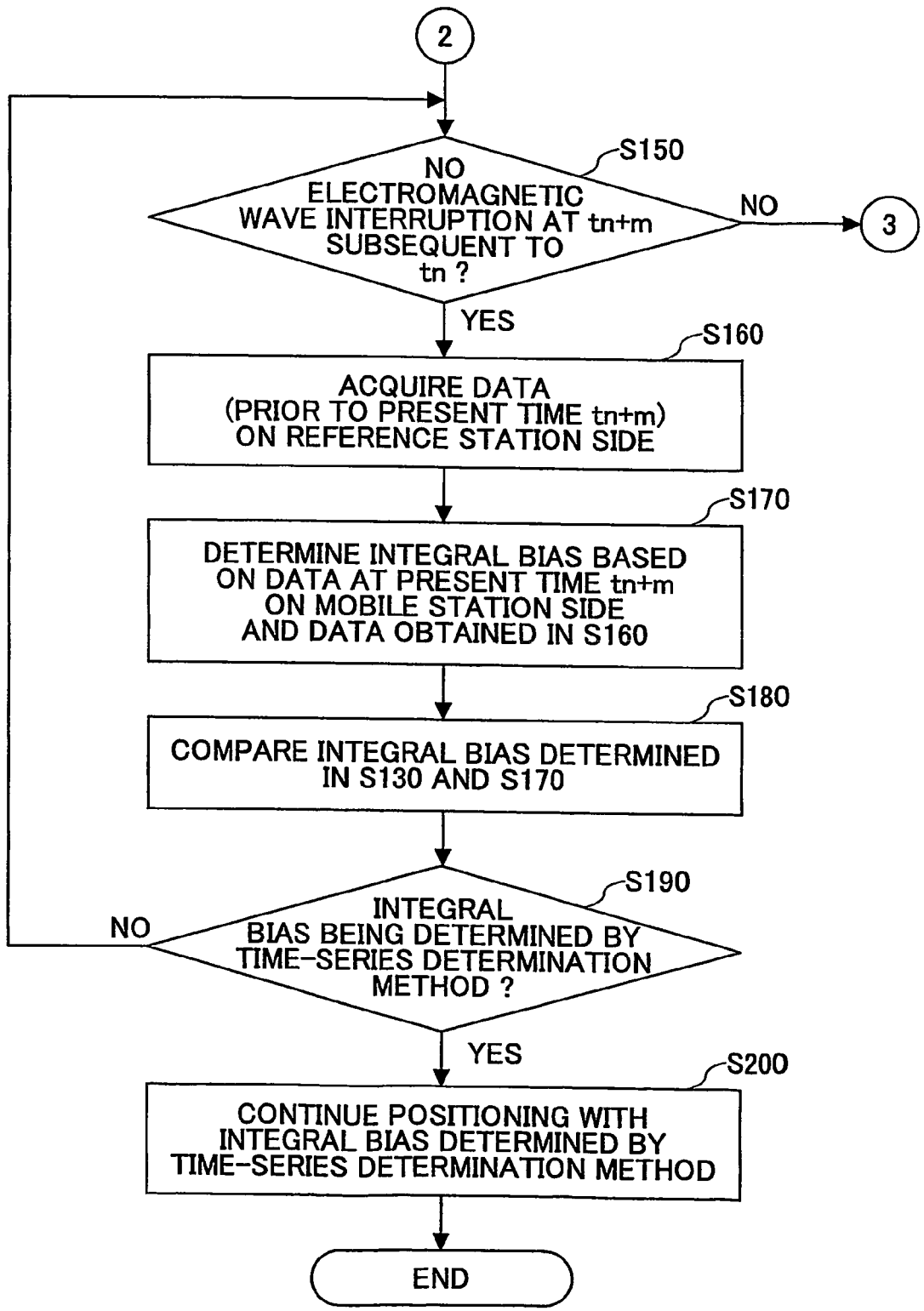
FIG. 6 is a flowchart illustrating the optional processing subsequent to the routine in FIG. 5.

FIG. 6 is a flowchart illustrating the optional processing subsequent to step S140 in FIG. 5 (that is, after the time $t=t_n$). For example, the routine in FIG. 6 may be executed when the phase accumulation value $\Phi_{iu}(t_n)$ obtained in step S120, or the position of the mobile station 30 deduced based on the phase accumulation value $\Phi_{iu}(t_n)$ are apparently unreasonable, for example, the change of the position of the mobile station 30 during the cycle-slip is not practical according to the moving speed of the mobile station 30.

In step S150, at the sample time $t=t_{n+1}$, next to the time $t=t_n$, the phase accumulation value $\Phi_{iu}(t_{n+1})$, which is calculated on the side of the mobile station 30, is input to the integer ambiguity estimation unit 48. It should be noted that after the time $t=tn$, if the phase accumulation value on the side of the mobile station 30 cannot be observed again because of the cycle slip, the routine in FIG. 5 is carried out again.

In step S160, the phase accumulations $\Phi_{ib}(t_{n-a-1})$, ..., $\Phi_{ib}(t_{n+1})$ prior to $t=t_{n+1}$ (here, from $t_{n-a-1}$ to $t_{n+1}$), which are calculated on the side of the reference station 20, are input to the integer ambiguity estimation unit 48. For example, these data may be acquired by sending an appropriate request signal from the mobile station 30. Alternatively, if the mobile station 30 is continuously receiving signals from the reference station 20, the integer ambiguity estimation unit 48 may read these data from a memory in the mobile station 30.

In step S170, the same processing as that in the step S130 in FIG. 5 is performed by using the phase accumulation value $\Phi_{iu}(t_{n+1})$. Namely, in formulae (12) and (13), $t_n$ is replaced with $t_{n+1}$. The integer ambiguity estimation unit 48 processes these data and determines the integer ambiguities $N_{ju}$, $N_{hu}$. In addition, in step S170, estimation of the integer ambiguities $N_{ju}$, $N_{hu}$ may be performed by combining the phase accumulation values obtained in the present step and the phase accumulation values obtained in the previous steps. For example, if the present routine is executed for the first time, the phase accumulation values obtained previously are the phase accumulation values obtained in step S130 in FIG. 5. If the present routine is not executed for the first time, the phase accumulation values obtained previously are the phase accumulation values obtained in step S130 in FIG. 5 and the phase accumulation values obtained in the previous step S170.

In step S180, the integer ambiguity previously determined is compared with the integer ambiguity presently obtained. For example, if it is determined that the integer ambiguity obtained in step S130 is obviously abnormal from history of the speed of the mobile station 30 during the cycle-slip, positioning can be continued with the integer ambiguity presently obtained (refer to step S140).

In step S190, step S150 to step S180 are repeatedly executed until an integer ambiguity is determined by the aforesaid time-series determination method, which is executed at the same time as the present routine (time subsequent to $t=t_n$, that is, $t=t_{n+m}$, (m=2, 3, ...)).

If an integer ambiguity is determined by the time-series determination method, in step S200, the integer ambiguities determined with the two methods are compared with each other, and then positioning is continued with the integer ambiguity determined by the time-series determination method (that is, taking over of the integer ambiguity can be performed) by well-known interferometric positioning methods.

FIG. 7 is a flowchart illustrating an operation of determining the integer ambiguity by the time-series determination method, which is performed in parallel to the routine in FIG. 5 and/or the routine in FIG. 6.

In step S300, it is determined whether the mobile station 30 is moving or not. This determination may be executed by the wheel speed sensor, when the mobile station 30 is a vehicle, or image processing.

If it is determined that the mobile station 30 is at rest, the routine proceeds to step S310.

If it is determined that the mobile station 30 is moving, the routine proceeds to step S340.

In step S310, a static model is used to execute the time-series determination method to determine the integer ambiguity. In step S310, if the mobile station 30 starts to move, the processing is stopped, and initialized. On the other hand, if the mobile station 30 is at rest until the integer ambiguity is determined, the routine proceeds to step S370. In step S370, the value of the thus determined integer ambiguity is compared with the value of the integer ambiguity obtained by the routines in FIG. 5 and FIG. 6 (refer to step S200).

In step S340, a movement model is used to execute the time-series determination method to determine the integer ambiguity. Specifically, the integer ambiguity estimation unit 48 establishes the following state equation indicated by (14) by using the known input introduced by the movement quantity introduction unit 44 (refer to formula (9)).

$$\eta(t_n)=\eta(t_{n-1})+U(t_{n-1})+W(t_{n-1}) \quad (14)$$

Here, $\eta(t_n)$ is a state variable at $t=t_n$, and may represent position coordinates (unknown) of the mobile station 30 [$X_u(t_n),Y_u(t_n),Z_u(t_n)$], and the double phase difference of the integer ambiguity $N_{jhbu}$. U and W are the aforesaid known input and external noise (system noise: normal white noise), respectively. In the static model, the item of the known input $U(t_{n-1})$ in formula (14) does not exist.

In addition, the integer ambiguity estimation unit 48 also establishes the following observation equation indicated by (15), which holds also in the static model.

$$Z(t_n)=H(t_n)*\eta(t_n)+V(t_n) \quad (15)$$

Here, Z and V represent an observation quantity and observation noise (normal white noise), respectively. The observation quantity Z is the double phase difference of the integer ambiguity $N_{jhbu}$ (refer to formula (10)). While the state equation (14) is a linear equation, the observation quantity Z is non-linear relative to the state variable $X_u, Y_u, Z_u$, the items in the formula (11) are partially differentiated relative to $X_u, Y_u, Z_u$, thereby obtaining H in formula (15).

Therefore, if applying the Kalman filter to the state equation (14) and the observation equation (15), the following equations can be obtained.

For updating the time, $$\eta(t_n)^{(-)}=\eta(t_{n-1})^{(+)}+U(t_{n-1})+W(t_{n-1}) \quad (16)$$

$$P(t_n)^{(-)}=P(t_{n-1})^{(+)}+Q(t_{n-1}) \quad (17)$$

For updating the observation, $$K(t_n)=P(t_{n-1})^{(-)}*H^T(t_n)*(H(t_n)*P(t_n)^{(-)}*H^T(t_n)+R(t_n))^{-1} \quad (18)$$

$$\eta(t_n)^{(+)}=\eta(t_n)^{(-)}+K(t_n)*(Z(t_n)-H(t_n)*\eta(t_n)^{(-)}) \quad (19)$$

$$P(t_n)^{(+)}=P(t_n)^{(-)}-K(t_n)*H(t_n)*P(t_n) \quad (20)$$

Here, Q and R represent the covariance matrix of the external noise and the covariance matrix of the observation noise, respectively. The formulae (13) and (19) are covariance equations. Here, the superscript $^{(-)}$ and $^{(+)}$ indicate time before and after the updating, respectively. In the static model, the item $U(t_{n-1})$ in formula (16) does not exist.

As a result, the estimated values of the integer ambiguity are found to be real solutions. However, since the integer ambiguity is actually an integer, the integer ambiguity is found to be an integer solution (that is, wave number) closest to the real solutions. For example, the LA-MBDA can be used for this purpose, which un-correlates the integer ambiguities, narrows the searching space of the integer solutions so as to facilitate finding the solutions.

In step S350, if it is determined the slip ratio of the mobile station 30 exceeds a preset value, since the reliability of the movement model (that is, the aforesaid known input) declines when the slip ratio of the mobile station 30 exceeds a preset value, the processing is stopped, and initialized in step S360. When the mobile station 30 is a vehicle, the slip ratio of the mobile station 30 can be detected based on an output signal from the wheel speed sensor or accelerator sensor, as is well known in the field of the ABS control.

If it is determined that the slip ratio of the mobile station 30 is does not exceed a preset value, the routine proceeds to step 370.

In step 370, the value of the thus determined integer ambiguity is compared with the value of the integer ambiguity obtained by the routines in FIG. 5 and FIG. 6 (refer to step S200).

After the processing is stopped as shown in step S330 and S360, the integer ambiguity determined by the routines in FIG. 5 or FIG. 6 is used until the integer ambiguity is determined by either of the models.

In the processing shown in FIG. 7, when cycle slip occurs, the processing is stopped and initialized, similar to steps S330 and S360, and afterward, the integer ambiguity determined by the routines in FIG. 5 or FIG. 6 is used until the integer ambiguity is determined by either of the models.

As described above, according to the present embodiment, by introducing a movement model (that is, input a known external input U(t) to the Kalman filter), the integer ambiguity can be determined precisely even when the mobile station 30 is moving. In addition, by separately using the movement model and the static model depending on the movement condition of the mobile station 30, it is possible to improve the estimation precision of the integer ambiguity. By setting the known input to the movement model to be zero when the mobile station 30 is at rest, the movement model alone is also sufficient.

In addition, by executing the processing in FIG. 7 in parallel to the routine in FIG. 5 and the routine in FIG. 6, the two independent integer ambiguities can be compared with each other, and an appropriate integer ambiguity can be selected to be used in positioning, hence enhancing positioning reliability. From this point of view, when the GPS receivers 22 and 32 are two-frequency receivers capable of receiving both of the L1 wave and L2 wave emitted from the GPS satellite 10, for each of the L1 wave and L2 wave, the same estimation processing can be performed in parallel simultaneously. In this case, because the sum of the periods of the two sides (Wide-Lane) can be created, and thereby, it is possible to further narrow the range of the candidates of the integer solutions.

FIG. 8 is a flowchart illustrating an operation performed in the reference station 20 corresponding to the operation performed in the mobile station 30 as shown in FIG. 5, FIG. 6, and FIG. 7.

In step S400, as a routine process, each of a number of reference stations 20 stores and manages the phase accumulation values $\Phi_{ib}$, which are measured based on the satellite signals from each of the GPS satellites $10_i$, in correspondence to each of sample times and each of the GPS satellites $10_i$. This treatment may be executed by a center facility (not illustrated) which controls the GPS satellites $10_i$.

In step 410, as long as the cycle slip does not occur concerning data related to a GPS satellite $10_k$, the processing in step 400 is performed continuously. Of course, each time new data are created, data prior to a certain time can be deleted sequentially. In addition, integer ambiguity $N_{ib}$ between each of the reference stations 20 and each of the GPS satellites $10_i$ can be introduced into processing of step 400, which is at an initial stage. Each of the reference stations 20 may determine the reliability of the obtained phase accumulation value $\Phi_{ib}$, and, for example, if abnormal values exist, it may be required not to store the abnormal values, or not to transmit the abnormal values to the mobile station 30.

The data stored and extracted in step S400 may be transmitted to the mobile station 30 via the communication facility 23 upon receiving a request signal from the mobile station 30, as described in step S110. Alternatively, the data may be broadcast in each cycle of receiving signals from each of the GPS satellites $10_i$.

In the former case, determination of a mobile station 30 as a transmission destination is accomplished by an ID code included in the request signal from the mobile station 30. In the latter case, the reference station 20 may send only special data to the mobile station 30 in response to the request from the mobile station 30.

In step S400, if it is detected that the cycle slip occurs concerning a GPS satellite $10_k$, the routine proceeds to step S420, and the reference station 20 erases data stored before the cycle slip related to the GPS satellite $10_k$ occurs.

As described above, according to the present embodiment, it is not necessary to transmit data generated before the cycle slip occurs to the mobile station 30. Alternatively, the stored data generated before the cycle slip occurs may also be held, but not to be transmitted to the mobile station 30, that is, only data generated after the cycle slip occurs are transmitted to the mobile station 30. Thus, the mobile station 30 can obtain highly reliable data from the reference station 20 by just transmitting a request signal, and does not need to check the reliability of the data transmitted from the reference station 20.

FIG. 9 is a flow chart illustrating an operation of the mobile station 30 which is capable of communicating with a number of reference stations 20.

In step S500, it is determined whether the mobile station 30 is able to communicate with more than one reference stations 20.

If it is determined that the mobile station 30 can communicate with more than one reference stations 20, the routine proceeds to step S510.

In step S510, the correspondence relation between the GPS satellite $10_i$ captured by the mobile station 30 and the GPS satellite $10_i$ captured by one reference station 20 is detected. At the same time, the number of the GPS satellites 10, from which both the mobile station 30 and the reference stations 20 receive signals (below referred to as "common satellite 10"), is determined.

In step S520, if it is determined that there is one reference station 20 which receives signals from the largest number of common satellites 10, the mobile station 30 adopts the data from the one reference station 20 and executes the routines illustrated in FIG. 5, FIG. 6, and FIG. 7. For example, considering the case in which the mobile station 30 can receive signals from seven GPS satellites $10_1$ to $10_7$, one reference station $20_1$ receives signals from six GPS satellites $10_1$ to $10_6$, and another one reference station $20_2$ receives signals from GPS satellites $10_1$ to $10_5$, and GPS satellites $10_8$ to $10_{11}$, because both the mobile station 30 and reference stations 20 receive signals from GPS satellites $10_1$ to $10_6$, GPS satellites $10_1$ to $10_6$ are the common satellites 10, and because in this example, the reference station $20_1$ receives signals from the largest number (six) of common GPS satellites $10_1$ to $10_6$, the reference station $20_1$ is selected.

On the other hand, if it is determined that there are more than one reference stations 20 each of which receives signals from the largest number of common satellites 10, the routine proceeds to step 530.

In step 530, the reception strength from each of the common satellites 10 at different reference stations 20 are compared with each other. The reception strength at different reference stations 20 can be measured at the reference stations 20, and may be transmitted to the mobile station 30.

In step S540, if it is determined that there is only one reference station 20 which receives signals from the common satellites 10 at a reception level higher than a reference level, the mobile station 30 adopts the data from the one reference station 20 and executes the routines illustrated in FIG. 5, FIG.

6, FIG. 7. In this case, a reference station may be selected which has the highest minimum reception strength of signals from the common satellites. In this case, the subsequent step 550 can be ignored.

On the other hand, if it is determined that there are more than one reference stations 20 each of which receive signals from the common satellites 10 at the best reception condition, the routine proceeds to step S550.

In step 550, distances to the mobile station 30 from different reference stations 20 are compared with each other.

In step 560, the reference station 20 having the shortest distance to the mobile station 30 is selected. As a result, the mobile station 30 adopts the data from the closest reference station 20, and executes the routines illustrated in FIG. 5, FIG. 6, and FIG. 7.

As described above, according to the present embodiment, because data from the most appropriate reference station 20 are used among the common satellites 10 with which the mobile station 30 is able to communicate, it is possible to prevent degradation of the integer ambiguity estimation precision and the position detection precision when the reference station 20 is changed along with the movement of the mobile station 30.

The priority order of selecting the reference station 20 is not limited to the above examples (namely, the number of the common satellites 10, reception strength, distance), for example, under the condition that the number of the common satellites 10 is larger than a specified number and the reception strength exceeds a minimum level, the reference station 20 closest to the mobile station 30 may be preferentially selected. In this case (that is, distance is preferential), it is possible to reduce the influence of the ionospheric layer refraction effect and tropospheric bending, and improve the estimation accuracy of the integer ambiguity.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, it is described that the Kalman filter is applied to the state equation (14) and the observation equation (15), but the least-squares or other estimation methods can also be used for estimating state quantities.

In addition, in the above embodiments, it is described that the double phase difference is calculated to eliminate influence of the initial phase of oscillators in the GPS receivers 22 and 32, and clock uncertainties. Of course, single phase difference can also be used as long as the influence of the initial phase of oscillators in the GPS receivers 22 and 32, and clock uncertainties can be eliminated. In addition, in the above embodiments, the influence of the ionospheric layer refraction effect, tropospheric bending effect, and multi-path are not considered, but the present invention is also applicable when considering these effects.

In the above, for simplicity, the GPS satellite $10_1$ is regarded as a reference satellite, but depending on the positions of the mobile station 30 and the reference station 20, any other GPS satellites 10 may also be used as the reference satellite. In addition, as long as there are four or more double phase differences which are related to GPS satellites common to the mobile station 30 and the reference station 20, any combination of the GPS satellites can be used for calculating the double phase differences.

In the above embodiment, a vehicle is raised as an example of the mobile station 30. The mobile station 30 may also include a folk lift or a robot with the receiver 32 and/or the calculation unit 40, and a mobile mobile phone or PDA with the receiver 32 and/or the calculation unit 40.

According to the carrier phase GPS positioning device of the present invention, it is possible to determine an integer ambiguity quickly and precisely.

This patent application is based on Japanese Priority Patent Application No. 2003-403640 filed on Dec. 2, 2003, the entire contents of which are hereby incorporated by reference.

The invention claimed is:

1. A carrier phase GPS positioning device, comprising:
a first integer ambiguity estimation unit that combines a plurality of first carrier phase accumulation data in a first duration extracted from data received from a satellite by a reference station at a fixed position, with one or more second carrier phase accumulation data received from the satellite by a mobile station in a second duration shorter than the first duration, and estimates an integer ambiguity included in the second carrier phase accumulation data; and
a positioning unit that determines the position of the mobile station using the integer ambiguity estimated by the first integer ambiguity estimation unit;
a movement quantity detection unit that detects a movement of the mobile station and a movement quantity of the mobile station when the mobile station is moving;
wherein the mobile station is a vehicle having wheels;
wherein the movement quantity detection unit detects a movement of the vehicle based on a wheel speed sensor that detects a rotational speed of the wheels; and
wherein when a slip ratio greater than a predetermined value is detected by at least the wheel speed sensor, the integer ambiguity estimation processing by a second integer ambiguity estimation unit is initialized, and the positioning unit determines the position of the mobile station using an integer ambiguity estimated by the first integer ambiguity estimation unit until the second integer ambiguity estimation unit estimates or re-estimates the integer ambiguity.

2. The carrier phase GPS positioning device as claimed in claim 1, wherein abnormal values are excluded from the first carrier phase accumulation data.

3. The carrier phase GPS positioning device as claimed in claim 1, wherein when reception of an electromagnetic wave emitted from the satellite is temporarily interrupted, data prior to the interruption is excluded from the first carrier phase accumulation data.

4. The carrier phase GPS positioning device as claimed in claim 1, wherein
the plurality of first carrier phase accumulation data in the first duration includes a plurality of carrier phase accumulation data transmitted from the satellite at a first number of times in the first duration; and
the second carrier phase accumulation data in the second duration include a plurality of carrier phase accumulation data transmitted from the satellite at a second number of times in the second duration, said second number being less than the first number.

5. The carrier phase GPS positioning device as claimed in claim 4, wherein the second number equals one.

6. The carrier phase GPS positioning device as claimed in claim 3, wherein after the first integer ambiguity estimation unit estimates the integer ambiguity, the positioning unit determines the position of the mobile station using data measured on the mobile station side alone.

7. The carrier phase GPS positioning device as claimed in claim 4, wherein
the second integer ambiguity estimation unit estimates, when the mobile station is at rest, the integer ambiguity included in the second carrier phase accumulation data, said estimation being made based on the first carrier phase accumulation data and the second carrier phase accumulation data in the period when the mobile station is at rest; and
a third integer ambiguity estimation unit estimates, while the mobile station is moving, the integer ambiguity included in the second carrier phase accumulation data while taking movement quantity detection results into consideration.

8. The carrier phase GPS positioning device as claimed in claim 7, wherein
after the second integer ambiguity estimation unit or the third integer ambiguity estimation unit estimates the integer ambiguity, the positioning unit determines the position of the mobile station using the integer ambiguity estimated by the second integer ambiguity estimation unit or the third integer ambiguity estimation unit instead of the integer ambiguity estimated by the first integer ambiguity estimation unit.

9. A carrier phase GPS positioning device comprising:
a first integer ambiguity estimation unit that combines a plurality of first carrier phase accumulation data in a first duration extracted from data received from a satellite by a reference station at a fixed position, with one or more second carrier phase accumulation data received from the satellite by a mobile station in a second duration shorter than the first duration, and estimates an integer ambiguity included in the second carrier phase accumulation data; and
a positioning unit that determines the position of the mobile station using the integer ambiguity estimated by the first integer ambiguity estimation unit;
a movement quantity detection unit that detects a movement of the mobile station and a movement quantity of the mobile station when the mobile station is moving;
a second integer ambiguity estimation unit that, when the mobile station is at rest, estimates the integer ambiguity included in the second carrier phase accumulation data, said estimation being made based on the first carrier phase accumulation data and the second carrier phase accumulation data in the period when the mobile station is at rest; and
a third integer ambiguity estimation unit that, while the mobile station is moving, estimates the integer ambiguity included in the second carrier phase accumulation data while taking movement quantity detection results into consideration;
wherein the plurality of first carrier phase accumulation data in the first duration includes a plurality of carrier phase accumulation data transmitted from the satellite at a first number of times in the first duration; and
the second carrier phase accumulation data in the second duration include a plurality of carrier phase accumulation data transmitted from the satellite at a second number of times in the second duration, said second number being less than the first number;
the mobile station is a vehicle having wheels;
the movement quantity detection unit detects a movement of the vehicle based on a wheel speed sensor that detects a rotational speed of the wheels; and
when a slip ratio greater than a predetermined value is detected by at least the wheel speed sensor, the integer ambiguity estimation processing by the third integer ambiguity estimation unit is initialized, and the positioning unit determines the position of the mobile station using the integer ambiguity estimated by the first integer ambiguity estimation unit until the third integer ambiguity estimation unit estimates or re-estimates the integer ambiguity.

10. The carrier phase GPS positioning device as claimed in claim 1, wherein
when a plurality of reference stations is present in a communication region, the reference station is selected which is able to communicate with more satellites in common with the satellite communicating with the mobile station, and
the first carrier phase accumulation data related to the selected reference station is used.

11. The carrier phase GPS positioning device as claimed in claim 10, wherein when there are plural of the reference stations able to communicate with the same number of the satellites, the reference station is selected which has the highest minimum reception strength of signals from the satellites.

12. The carrier phase GPS positioning device as claimed in claim 1, wherein
when a plurality of reference stations, which receive signals from a plurality of common satellites and the signal reception strength with each of the common satellites exceeds a predetermined value, are present in a communication region, the reference station is selected which is closest to the mobile station, and
the first carrier phase accumulation data related to the selected reference station is used.

13. A carrier phase GPS positioning method, comprising the steps of:
combining a plurality of first carrier phase accumulation data in a first duration extracted from data received from a satellite by a reference station at a fixed position, with one or more second carrier phase accumulation data received from the satellite by a mobile station in a second duration shorter than the first duration, and estimating an integer ambiguity included in the second carrier phase accumulation data; and
determining the position of the mobile station using the estimated integer ambiguity;
wherein the mobile station is a vehicle having wheels;
a movement quantity detection unit detects a movement of the vehicle based on a wheel speed sensor that detects a rotational speed of the wheels; and
when a slip ratio greater than a predetermined value is detected by at least the wheel speed sensor, an integer ambiguity is processed, and a position of the mobile station is determined using the estimated integer ambiguity.

14. A carrier phase GPS positioning method, comprising the steps of:
acquiring a carrier phase accumulation value at one time on the mobile station side;
acquiring a plurality of carrier phase accumulation values at a plurality of times prior to the one time on the reference station side;
combining the carrier phase accumulation values on the reference station side at the plural times, with a carrier phase accumulation value on the mobile station side at the one time, and estimating an integer ambiguity included in the carrier phase accumulation value of signals transmitted from the satellite received by the mobile station, the plurality of first carrier phase accumulation data in the first duration including a plurality of carrier phase accumulation data transmitted from the satellite at a first number of times in the first distance, the second phase accumulation data in the second duration including a plurality of carrier phase accumulation data transmitted from the satellite at a second number of time in the second duration, said second number being less than the first number;

estimating the integer ambiguity included in the second carrier phase accumulation data and the second carrier phase accumulation date in a second integer ambiguity estimation unit when the mobile station is at rest, and estimating the integer ambiguity included in the second phase accumulation data in a third ambiguity estimation unit while the mobile station is moving, while taking movement quantity detection results into consideration;

wherein the mobile station is a vehicle having wheels, and the movement quantity detection unit detects a movement of the vehicle based on a wheel speed sensor detection a rotational speed of the wheels.

* * * * *